(12) United States Patent
Singh et al.

(10) Patent No.: US 12,054,152 B2
(45) Date of Patent: Aug. 6, 2024

(54) ENHANCED OBJECT DETECTION

(71) Applicant: Ford Global Technologies, LLC, Dearborn, MI (US)

(72) Inventors: Gurjeet Singh, Castro Valley, CA (US); Sowndarya Sundar, Mountain View, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 685 days.

(21) Appl. No.: 17/146,739

(22) Filed: Jan. 12, 2021

(65) Prior Publication Data

US 2022/0219698 A1 Jul. 14, 2022

(51) Int. Cl.
| B60W 30/18 | (2012.01) |
| B60R 1/00 | (2022.01) |
| G06F 18/214 | (2023.01) |
| G06N 3/08 | (2023.01) |
| G06N 20/20 | (2019.01) |
| G06V 20/56 | (2022.01) |

(52) U.S. Cl.
CPC ....... B60W 30/18036 (2013.01); B60R 1/002 (2013.01); G06F 18/214 (2023.01); G06N 3/08 (2013.01); G06N 20/20 (2019.01); G06V 20/56 (2022.01)

(58) Field of Classification Search
CPC . B60W 30/18036; G06N 20/20; G06N 3/045; G06N 3/08; G06N 20/00; G06N 3/04; G06N 3/047; G06N 3/084

USPC .......................................................... 382/156
See application file for complete search history.

(56) References Cited

U.S. PATENT DOCUMENTS

| 10,664,728 | B2 | 5/2020 | Govindaraj et al. |
| 2019/0279044 | A1 | 9/2019 | Vasisht et al. |
| 2020/0026268 | A1 | 1/2020 | Jiang et al. |
| 2020/0285913 | A1 | 9/2020 | Gavrillovic et al. |
| 2020/0302230 | A1 | 9/2020 | Chang et al. |
| 2021/0004589 | A1* | 1/2021 | Turkelson ........ G06V 30/19173 |

* cited by examiner

*Primary Examiner* — Ajibola A Akinyemi
(74) *Attorney, Agent, or Firm* — Christopher Storms; Bejin Bieneman PLC

(57) ABSTRACT

A computer is programmed to determine a training dataset that includes a plurality of images each including a first object and an object label, train a first machine learning program to identify first object parameters of the first objects in the plurality of images based on the object labels and a confidence level based on a standard deviation of a distribution of a plurality of identifications of the first object parameters, receive, from a second machine learning program, a plurality of second images each including a second object identified with a low confidence level, process the plurality of second images with the first machine learning program to identify the second object parameters with a corresponding second confidence level that is greater than a second confidence level, retrain the first machine learning program based on the identified second object parameters.

21 Claims, 6 Drawing Sheets

ENHANCED OBJECT DETECTION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

Figure 1:
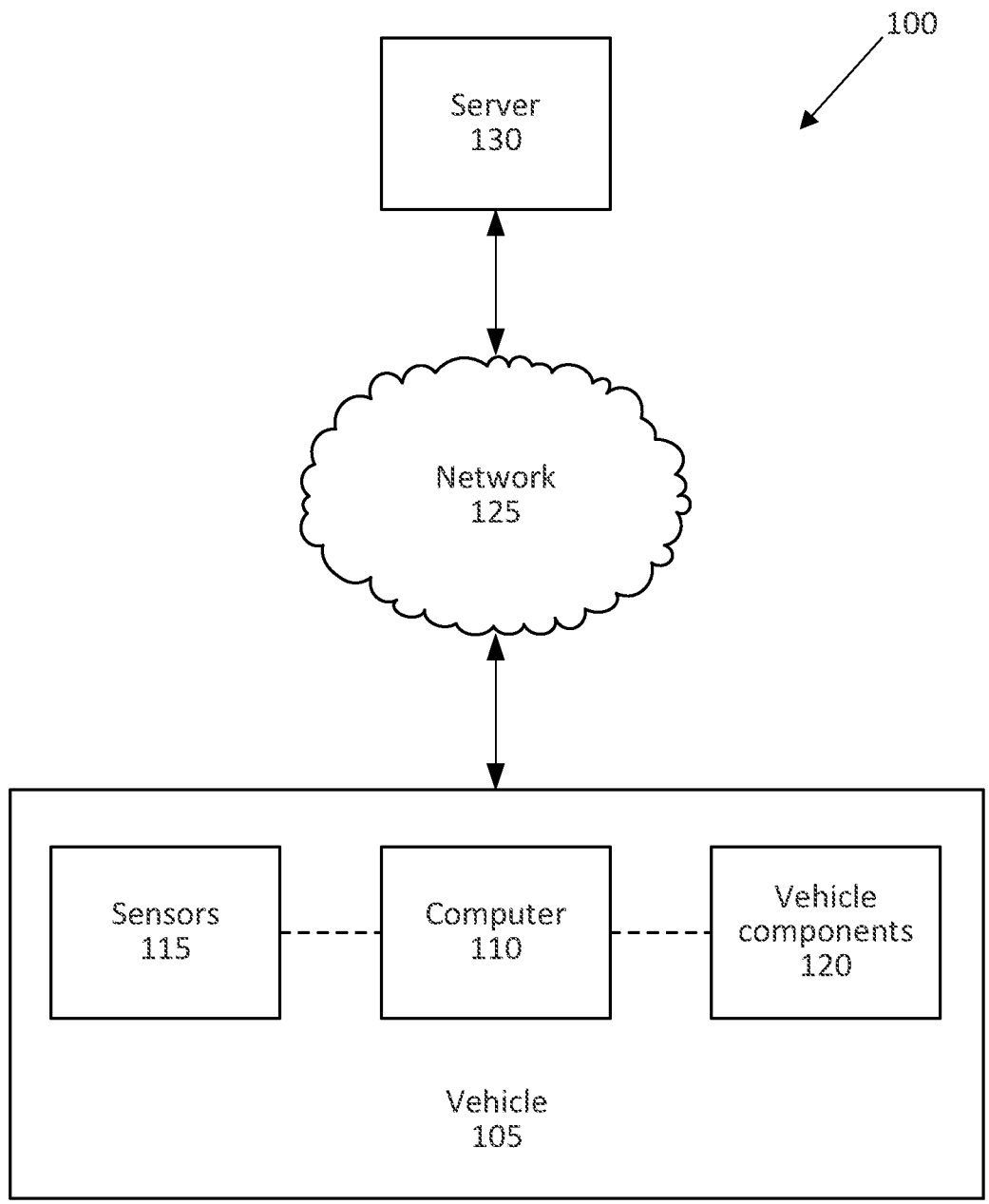
FIG. 1 is a block diagram of an example system for operating a vehicle.

A system includes a computer including a processor and a memory, the memory storing instructions executable by the processor to determine a training dataset that includes a plurality of images each including a first object and an object label corresponding to the object, train a first machine learning program to identify respective object parameters of the first objects in the plurality of images based on the object labels corresponding to the first objects and a confidence level based on a standard deviation of a distribution of a plurality of identifications of the object parameters, receive, from a second machine learning program, a plurality of second images each including a second object identified with a low confidence level, wherein the low confidence level corresponds to a confidence level that the second object identity is correct being less than a first threshold, process the plurality of second images with the first machine learning program to identify second object parameters with a corresponding second confidence level, and when the first machine learning program identifies the second object parameters with a second confidence level that is greater than a second threshold, retrain the first machine learning program based on the identified second object parameters.

The second objects in the second images can be trailers, and the first machine learning program can be trained to output an angle between an axis along the trailer and a vertical axis of the second image as the second object parameter, the second confidence level based on a standard deviation of a distribution of predicted angles from a mean predicted angle.

The instructions can further include instructions to send a message to a vehicle including the second images, respective identification of the trailers in each of the second images, the output angle of each of the second images, and the second confidence level for each of the second images.

The vehicle can include a computer programmed to actuate a component to move the vehicle in reverse based on the output angles.

The second confidence level of each of the second images can be a multiplicative inverse of the standard deviation of the distribution of the predicted angles from the mean predicted angle.

The instructions can further include instructions to train the second machine learning program to classify the second objects in each of the second images into one of a plurality of classifications based on an identified feature of the object.

The instructions can further include instructions to output, from the second machine learning program, an identification of no second object in one of the second images, to input the second image and the identification of no object to the first machine learning program, and to output an identification of the second object parameter in the second image from the first machine learning program.

The instructions can further include instructions to receive the second images from a vehicle and to assign, with the second machine learning program, each of the plurality of the second images to one of a plurality of classifications.

The instructions can further include instructions to output, from the first machine learning program, a detected second object parameter in one of the plurality of second images not included in one of the plurality of classifications of the second machine learning program.

The second machine learning program can include at least one of an autoencoder, a variational encoder, a neural network, or a generative adversarial network.

The instructions can further include instructions to encode a latent image for each of the second images and to output a detection of a second object in the latent image from the second machine learning program.

The instructions can further include instructions to assign each image in the training dataset to a classification based on the object label.

A method includes determining a training dataset that includes a plurality of images each including a first object and an object label corresponding to the object, training a first machine learning program to identify respective object parameters of the first objects in the plurality of images based on the object labels corresponding to the first objects and a confidence level based on a standard deviation of a distribution of a plurality of identifications of the first object parameters, receiving, from a second machine learning program, a plurality of second images each including a second object identified with a low confidence level, wherein the low confidence level corresponds to a confidence level that the second object identity is correct being less than a first threshold, processing the plurality of second images with the first machine learning program to identify second object parameters with a corresponding second confidence level, and when the first machine learning program identifies the second object parameters with a high second confidence level that is greater than a second threshold, retraining the first machine learning program based on the identified second object parameters.

The second objects in the second images can be trailers, and the first machine learning program can be trained to output an angle between an axis along the trailer and a vertical axis of the second image as the second object parameter, the second confidence level based on a standard deviation of a distribution of predicted angles from a mean predicted angle.

The method can further include sending a message to a vehicle including the second images, respective identification of the trailers in each of the second images, the output angle of each of the second images, and the second confidence level for each of the second images.

The method can further include actuating a component to move the vehicle in reverse based on the output angles.

The method can further include training the second machine learning program to classify the second objects in each of the second images into one of a plurality of classifications based on an identified feature of the object.

The method can further include outputting, from the second machine learning program, an identification of no second object in one of the second images, inputting the second image and the identification of no object to the first machine learning program, and outputting an identification of the second object parameter in the second image from the first machine learning program.

The method can further include receiving the second images from a vehicle and assigning, with the second machine learning program, each of the plurality of the second images to one of a plurality of classifications.

The method can further include encoding a latent image for each of the second images and to output a detection of a second object in the latent image from the second machine learning program.

The method can further include assigning each image in the training dataset to a classification based on the object label.

The method can further include outputting, from the first machine learning program, a detected second object in one of the plurality of second images not included in one of the plurality of classifications of the second machine learning program.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A machine learning program, such as a deep learning algorithm, can detect objects and/or object parameters in images collected by a vehicle. A training dataset including a plurality of reference images can train the machine learning program to identify the object parameters in the images. Based on the training dataset, the machine learning program can output a confidence level that is based on a likelihood that an identification of the object parameter in an image is correct. Outputting the identification of the object parameter and the confidence level from the machine learning program can provide the vehicle with data to aid in operation of the vehicle. For example, identifying a trailer angle of a rear trailer attached to the vehicle can aid the vehicle when moving in reverse. The machine learning program can be trained to identify object parameters in images that the vehicle may not identify.

The training dataset can be populated with images from external servers, such as websites on the Internet. An image collection program, such as a web scraping algorithm, can collect images of objects and text to label the objects. The images with the annotated text labels can improve the training dataset by providing more images with more objects than when the training dataset was initially compiled. For example, when new models, classes, and/or types of trailers are introduced to the market, the image collection program can collect images and annotate the images with text labels identifying the new models, classes, and/or types. The newly annotated images can be added to the training dataset, and the machine learning program can be retrained to identify the new models of the trailers. Updating the training dataset with images collected from a network such as the Internet can improve training and use of the machine learning program to identify the object parameters in the images.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled or monitored by the computer 110. A semi-autonomous mode is one in which at least one of vehicle 105 propulsion (typically via a powertrain including an electric motor and/or internal combustion engine), braking, and steering are controlled or monitored at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
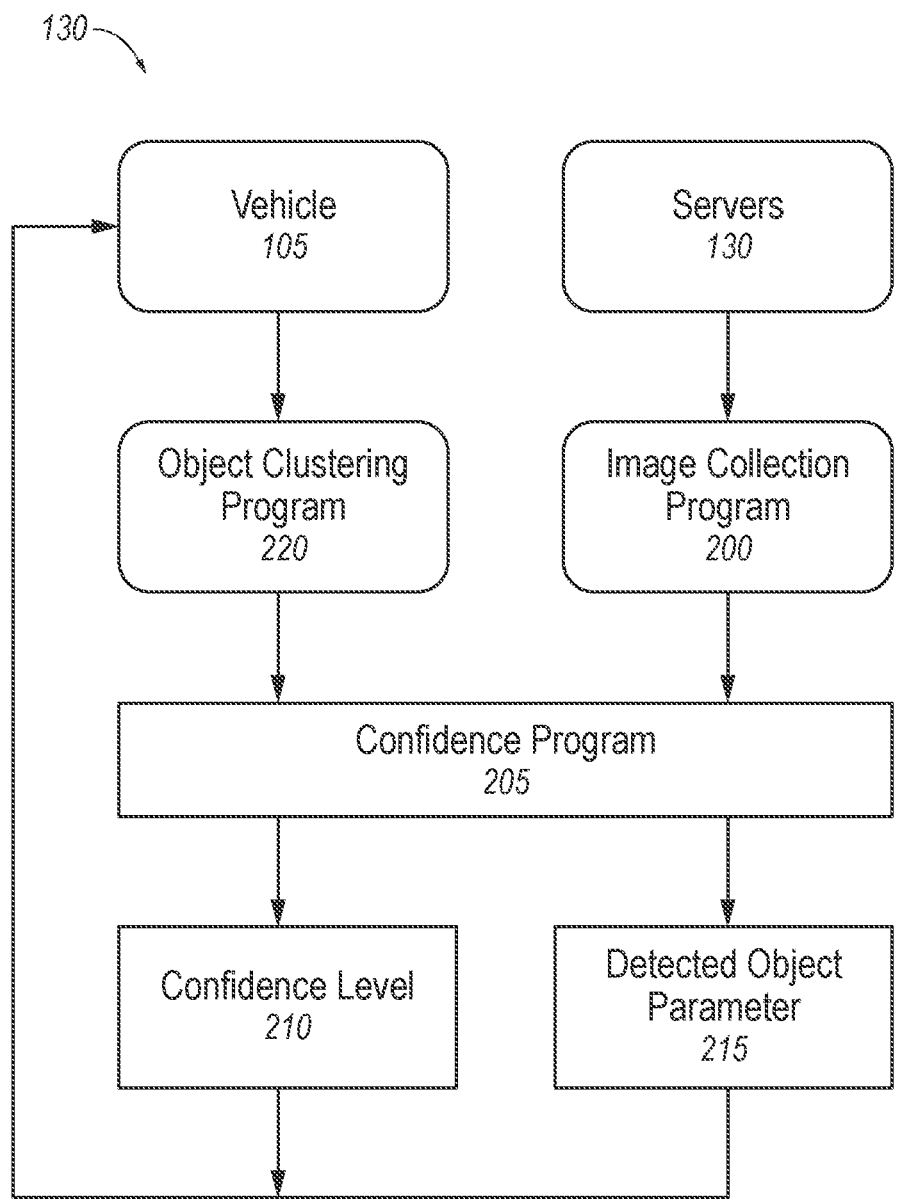
FIG. 2 is a block diagram of an example server programmed to identify an object parameter in an image.

FIG. 2 is a block diagram of example machine learning programs that can identify objects and object parameters in images. An "object parameter" is one or more physical parameters of an object in the image. The machine learning programs can be stored in a memory of a server 130. A computer 110 in a vehicle 105 can send one or more images to the server 130, the server 130 can apply the machine learning programs to the images, and the server 130 can output identifications of objects in the images. The computer 110 can, based on the identified objects, actuate one or more components 120 to operate the vehicle 105. Example object parameters that can be identified in the images include, e.g., a trailer angle as described below, a trailer type, a trailer length, etc.

The server 130 can include an image collection program 200. An "image collection" program 200 searches external servers 130 for images with object labels. For example, the image collection program 200 can search websites on the Internet for images with HTML and/or XML tags that identify objects in the images. The image collection program 200 parses text in coding of websites for specified keywords and returns images that are listed on websites with the specified keywords. The image collection program 200 can assign an object label to the images received from the websites based on the specified keywords. The image collection program 200 can, upon identifying the keywords in the websites, annotate the collected image with an object label including the identified keywords. The image collection program 200 can be a conventional web scraper algorithm, e.g., Beautiful Soup, available (as of the date of filing this patent application) at https://www.crummy.com/software/BeautifulSoup/bs4/doc/, Web Scraper, ParseHub, etc. The keywords can be specified by human input, e.g., a manufacturer, a supplier, a retailer, a product manual, a product type, etc., and the image collection program 200 can search the external servers 130 for the specified keywords.

The server 130 can build a training dataset with the images collected by the image collection program 200. The training dataset can be a set of images that each include an object and an annotated object label identifying the object. The server 130 can use the training dataset to train one or more machine learning programs, such as a deep learning algorithm. That is, the training dataset can be reference images for training a machine learning program, such as a deep neural network, a clustering program, etc. As described below, the machine learning program adjust outputs based on the object labels identifying the objects in the images in the training dataset.

The server 130 includes a machine learning program 205 trained to output a confidence level 210 of an identification 215 of an object parameter in an image. In FIG. 2, the machine learning program 205 is a confidence level determining machine learning program 205. The "confidence level," is a based on a standard deviation of a distribution of a plurality of identifications of the object parameters performed by the machine learning program 205. Thus, a confidence level 210 can be, for example, a multiplicative inverse of the standard deviation. Alternatively, the confidence level 210 can be a text value, e.g., "low," "medium," or "high," and the machine learning program 205 can output each text value when the standard deviation of the distribution is within a specific range of values, e.g., the machine learning program 205 can output a "low" confidence level 210 when the standard deviation is greater than 4, a "medium" confidence level when the standard deviation is between 1 and 4, and a "high" confidence level when the standard deviation is less than 1. The machine learning program 205 receives, as input, an image including an object. The machine learning program 205 outputs an identification 215 of the object parameter and a confidence level 210 of identifying the object. The server 130 can train the machine learning program 205 with the training dataset to identify object parameters in the images based on the object labels and to determine a respective confidence level 210 of identification 215 of each object parameter. That is, the machine learning program 205 can assign each image in the training dataset to a classification (e.g., a class) based on the object label annotated to the image. The machine learning program 205 can be, e.g., a deep neural network 400 as described below.

The server 130 includes a second machine learning program 220. The second machine learning program 220 identifies objects and/or object parameters in images sent from a vehicle. The second machine learning program 220 can be, e.g., a clustering program that assigns each input image to a cluster corresponding to a classification of an object. In FIG. 2, the second machine learning program 220 is a clustering program. That is, the second machine learning program 220 can include a plurality of clusters, each cluster being a classification of a specific type of object, and the second machine learning program 220 can assign an input image to one of the clusters. Alternatively or additionally, one or more of the clusters can be a "latent" cluster, i.e., a cluster that does not classify a specific type of object but includes images that share one or more common features identified by the clustering program. The second machine learning program 220 can output the object associated with the assigned cluster, identifying the object in the image.

The second machine learning program 220 can receive low confidence images from the vehicle 105. A "low confidence" image is an image in which the computer 110 of the vehicle 105 determines that a confidence level of the image is below a threshold. That is, the computer 110 can be programmed with a machine learning program such as the confidence program 205 that identifies the confidence level of identifying an object parameter in an image. The computer 110 can send images to the server 130 that have respective confidence levels below the threshold, and the second machine learning program 220 can assign the low confidence images to one or more clusters, as described above. To identify the object and/or object parameter in the low confidence image, the second machine learning program 220 can be trained with reference images that include annotations of identifications of objects and/or object parameters. The reference images can be low confidence images with annotations, and the second machine learning program 220 can output an identification of objects and/or object parameters in the reference images. The server 130 can train the second machine learning program 220 until a cost function, as described below, is minimized.

The server 130 can train the second machine learning program 220 to classify the low confidence images into one of a plurality of classifications and/or latent clusters based on an identified feature of the object. A "feature" of the object is a part or element that identifies a type of object from other types of objects. Example features can include, e.g., trailer size, attachment shape, brand name, amount of attachments, etc. Additionally or alternatively, the second machine learning program 220 can assign the low confidence images to a cluster based on a latent feature, i.e., a feature not associated with a predetermined identified part or element. Each cluster can thus be associated with a feature of the object, and each image can be assigned to one of the clusters based on the classification of a feature in the image.

The second machine learning program 220 can include at least one of an autoencoder, a variational encoder, a neural network, or a generative adversarial network. For example, when the second machine learning 220 program includes an autoencoder, the second machine learning program 220 can encode a latent image for each of the input images and output a detection of an object in the latent image (i.e., assign the latent image to a cluster) from the second machine learning program 220. A latent image is an image in which data that are not likely to be an object are ignored, and the autoencoder only considers data that could be used to identify as an object. The autoencoder can assign the latent image to a cluster because the extraneous data are ignored, and the algorithms of the autoencoder can be trained to assign the latent image to a cluster based on the limited latent data.

The second machine learning program 220 can output an identification of no cluster to which an input low confidence image can be assigned, i.e., no object could be detected in the low confidence image. The second machine learning program 220 can determine that a the low confidence image cannot be assigned to a cluster and output the low confidence image with no assigned cluster. That is, the second machine learning program 220 can be trained to identify objects in low confidence images from the vehicle 105 by assigning the low confidence images to a cluster, and the second machine learning program 220 may not assign a cluster to one or more of the low confidence images. The server 130 can input the low confidence images in which the second machine learning program 220 identified no object to the machine learning program 205. The machine learning program 205 can output an identification 215 of the object parameter in the image and a confidence level 210, as described above, of the identification of the object parameter. The machine learning program 205 can thus identify object parameters in images that the second machine learning program 220 could not identify.

The machine learning program 205 can output a confidence level 210 for each image and object parameter identification 215 from the second machine learning program 220. The second machine learning program 220 outputs an identified object parameter in the image, and the machine learning program 205 outputs a second identification 215 of the object parameter and a confidence level 210 that the identification of the object parameter is correct. The machine learning program 205 thus corroborates the identification of the object parameter from the second machine learning program 220 and provides a confidence level that the identification from the second machine learning program 220 is correct. To determine the confidence level, the machine learning program 205 generates a distribution of a plurality of identifications of the object parameter in the image, determines a standard deviation of the distribution from a mean of the plurality of identifications, and outputs the confidence level 210 based on the standard deviation, e.g., as a multiplicative inverse of the standard deviation. The machine learning program 205 can detect an object parameter in the image from the second machine learning program 220 that is not included in one of the plurality of clusters of the second machine learning program 220, as described above. That is, the machine learning program 205 can identify object parameters in the image that the second machine learning program 220 cannot identify. The machine learning program 205 thus improves detection of objects and/or object parameters from the second machine learning program 220 and provides the computer 110 with the confidence level 210 of the identification 215 of the object parameter.

The server 130 can add high confidence images to the training dataset to retrain the machine learning program 205. A "high confidence" image is an image in which the machine learning program 205 identified an object parameter with a confidence level 210 above a second threshold. The second threshold can be determined based on a minimum confidence level 210 of an image in the training dataset. That is, when the machine learning program 205 outputs a confidence level 210 of an identification 215 of an object parameter in an image that is greater than a lowest confidence level 210 of all images in the training dataset, the server 130 can include the image and the confidence level 210 in the training dataset. Adding high confidence images to the training dataset can improve operation of the machine learning program 205 by providing additional reference images to train the machine learning program 205. The server 130 can retrain the machine learning program 205 with the high confidence images in the training dataset to improve precision and accuracy of the output identification 215 of objects in images, thereby resulting in higher confidence levels 210 that the identifications are correct.

Figure 3:
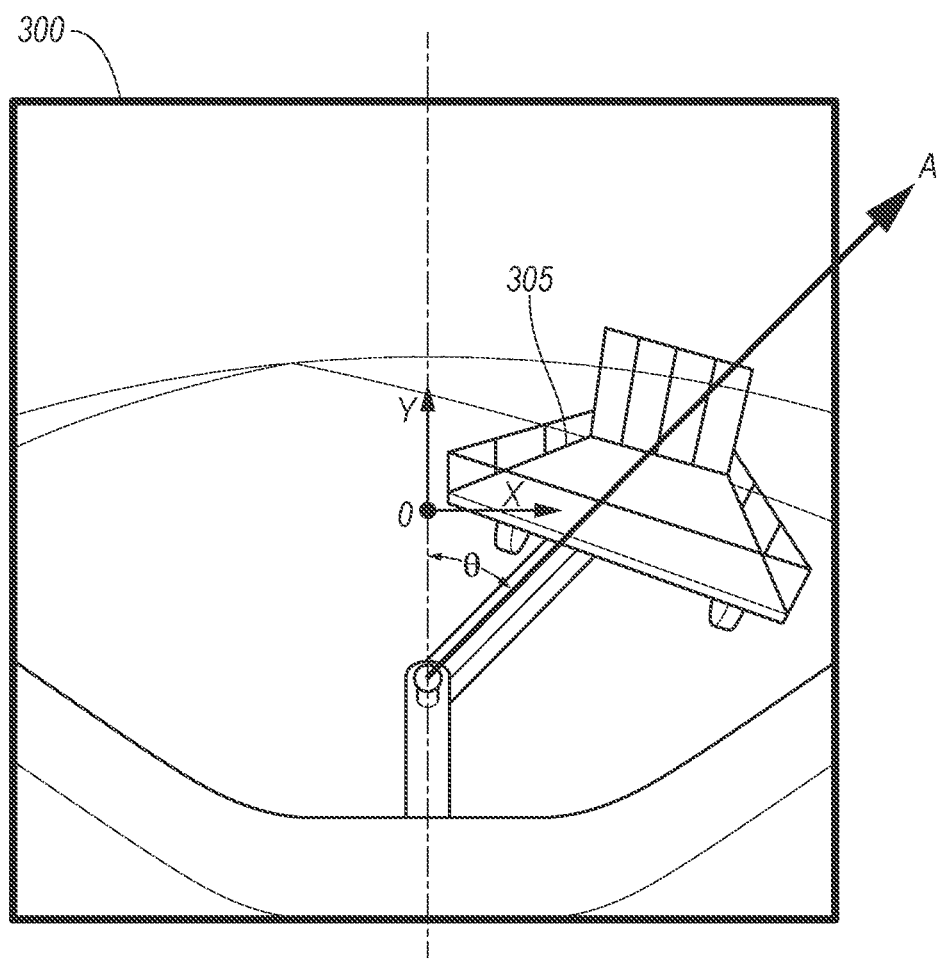
FIG. 3 is an example image in which the server can identify the object parameter.

FIG. 3 is an image 300 including an object. The computer 110 of the vehicle 105 can collect the image 300 with a sensor 115, e.g., a rear camera. The image 300 in the example of FIG. 3 is an image 300 of a rear trailer 305. The computer 110 can define a two-dimensional coordinate system having a horizontal axis X and a vertical axis Y extending from an origin O. An axis A of the trailer 305 can define an angle θ with the vertical axis Y as an object parameter of the rear trailer 305. The angle θ describes an orientation of the trailer 305 relative to the vehicle 105. When the vehicle 105 moves in reverse, the computer 110 can use data about the orientation of the trailer 305, represented by the angle θ, to actuate one or more components 120 to move the trailer 305. That is, when the vehicle 105 moves in reverse, the trailer 305 may move in a different direction than the vehicle 105, and the computer 110 can actuate at least one of a steering, a propulsion and/or a brake to move the vehicle 105 such that the trailer 305 moves in a direction intended by a vehicle operator.

The machine learning program 205 and/or the second machine learning program 220 can output the angle θ based on the input image 300. As described above, the machine learning program 205 can, using a machine learning technique such as deep learning, output the angle θ and a confidence level 210 that the angle is correct. The machine learning program 205 can receive the image 300 from the second machine learning program 220, as described above, as a low confidence image. The machine learning program 205 can output the confidence level 210 of identifying the angle θ in the low confidence image 300. For example, the confidence level 210 can be based on a standard deviation between predictions of the angle θ in the image 300 determined by the machine learning program 205. For example, the machine learning program 205 can predict the angle θ in the image 300 a plurality of times, generating a distribution of possible angles θ. The machine learning program 205 can calculate a mean predicted angle $\bar{\theta}$ and can output the mean predicted angle $\bar{\theta}$ as the identified angle θ. The machine learning program 205 can identify a standard deviation of the possible angles θ from the mean angle $\bar{\theta}$ and, based on the standard deviation, determine the confidence level 210. The server 130 can send a message to the computer 110 via the network 125 with the output angle θ of the input image, the confidence level 210, and the original image 300.

The computer 110 of the vehicle 105 can actuate one or more components 120 based on the object parameter identified by the machine learning program 205 and/or the second machine learning program 220 and the confidence level 210 output by the machine learning program 205. For example, the computer 110 can actuate a propulsion and a steering to move the vehicle 105 in reverse based on the angle θ of the trailer 305 identified in the image 300. When moving in reverse with a trailer 305, the vehicle 105 may move in a manner that causes the trailer 305 to deviate from an intended direction. With the angle θ of the trailer 305 in the image 300, the computer 110 can actuate the propulsion and the steering such that the vehicle 105 and the trailer 305 move in a direction intended by an operator of the vehicle 105. That is, the identification of the object improves accuracy and precision of operation of the vehicle 105.

Figure 4:
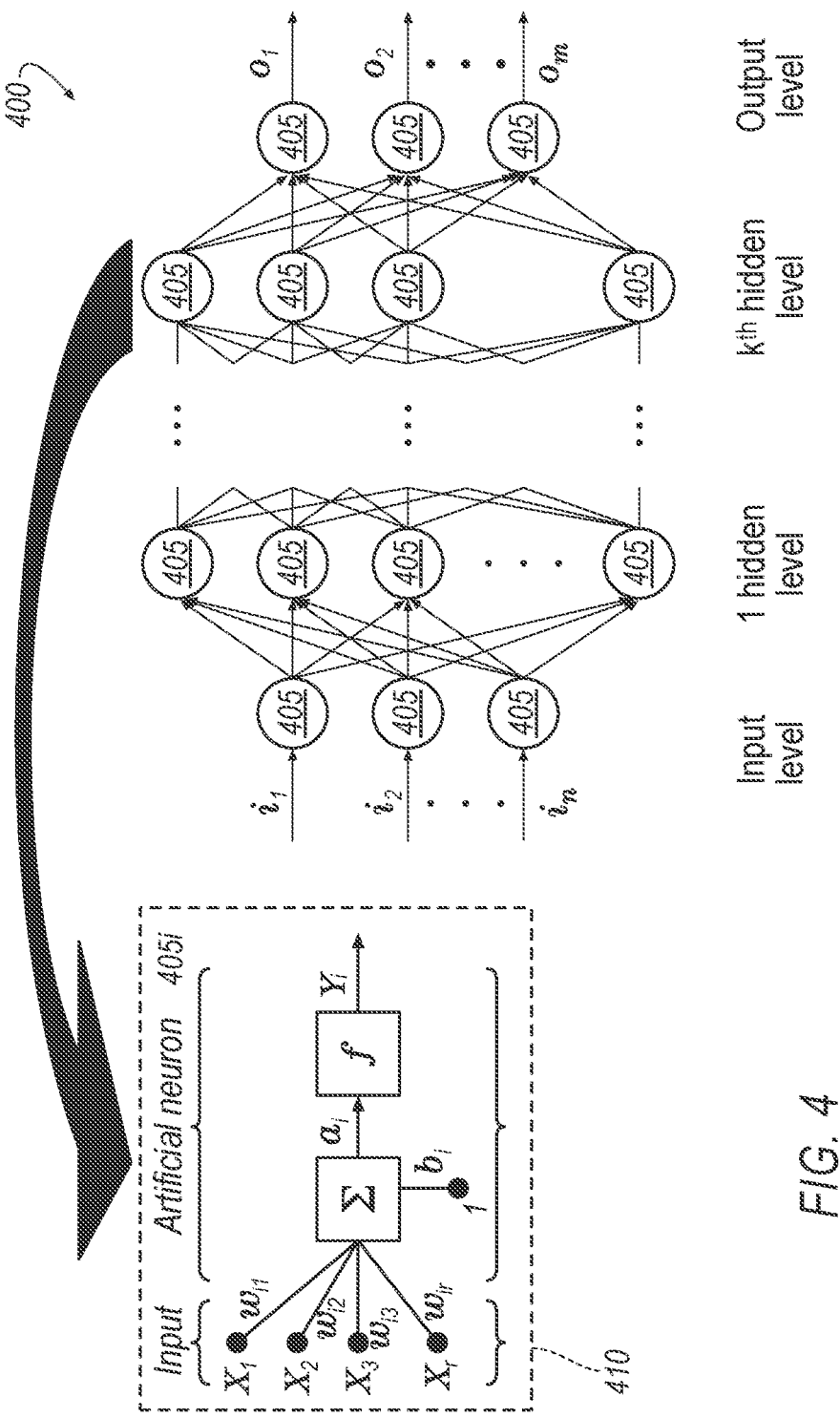
FIG. 4 is a diagram of an example neural network.

FIG. 4 is a diagram of an example deep neural network (DNN) 400 that could be trained to identify an object parameter in an image 300. The machine learning program 205 can be a DNN 400. The DNN 400 can be a software program that can be loaded in memory and executed by a processor included in the server 130, for example. The DNN 400 can include n input nodes 405, each accepting a set of inputs i (i.e., each set of inputs i can include one or more inputs X). The DNN 400 can include m output nodes (where m and n may be, but typically are not, a same natural number) provide sets of outputs $o_1 \ldots o_m$. The DNN 400 includes a plurality of layers, including a number k of hidden layers, each layer including one or more nodes 405. The nodes 405 are sometimes referred to as artificial neurons 405, because they are designed to emulate biological, e.g., human, neurons. The neuron block 410 illustrates inputs to and processing in an example artificial neuron 405i. A set of inputs $X_1 \ldots X_r$ to each neuron 405 are each multiplied by respective weights $w_{i1} \ldots w_{ir}$, the weighted inputs then being summed in input function Σ to provide, possibly adjusted by a bias $b_i$, net input $a_i$, which is then provided to activation function $f$, which in turn provides neuron 405i output $Y_i$. The activation function $f$ can be a variety of suitable functions, typically selected based on empirical analysis. As illustrated by the arrows in FIG. 4, neuron 405 outputs can then be provided for inclusion in a set of inputs to one or more neurons 405 in a next layer.

The DNN 400 can be trained to accept as input data, e.g., reference images from a camera, and to output one or more parameters for identifying an object in the reference images. For example, the DNN 400 could be trained to output a confidence level of identification of an object in an image. That is, the DNN 400 can be trained with ground truth data, i.e., data about a real-world condition or state. Weights w can be initialized by using a Gaussian distribution, for example, and a bias b for each node 405 can be set to zero. Training the DNN 400 can including updating weights and biases via conventional techniques such as back-propagation with optimizations.

A set of weights w for a node 405 together are a weight vector for the node 405. Weight vectors for respective nodes 405 in a same layer of the DNN 400 can be combined to form a weight matrix for the layer. Bias values b for respective nodes 405 in a same layer of the DNN 400 can be combined to form a bias vector for the layer. The weight matrix for each layer and bias vector for each layer can then be used in the trained DNN 400.

In the present context, the ground truth data used to train the DNN 400 could include image data with object labels, e.g., collected by an image collection program, as described above. For example, the image collection program can collect a plurality of images, and the images then can be labeled for training the DNN 400, i.e., object labels can be specified identifying objects in the images. The DNN 400 can then be trained to output data values that correlate to the objects, and the output data values can be compared to the annotations to identify a difference, i.e., a cost function of the output data values and the input annotated images. The weights w and biases b can be adjusted to reduce the output of the cost function, i.e., to minimize the difference between the output data values and the input annotated images. When the cost function is minimized, the server 130 can determine that the DNN 400 is trained.

Figure 5:
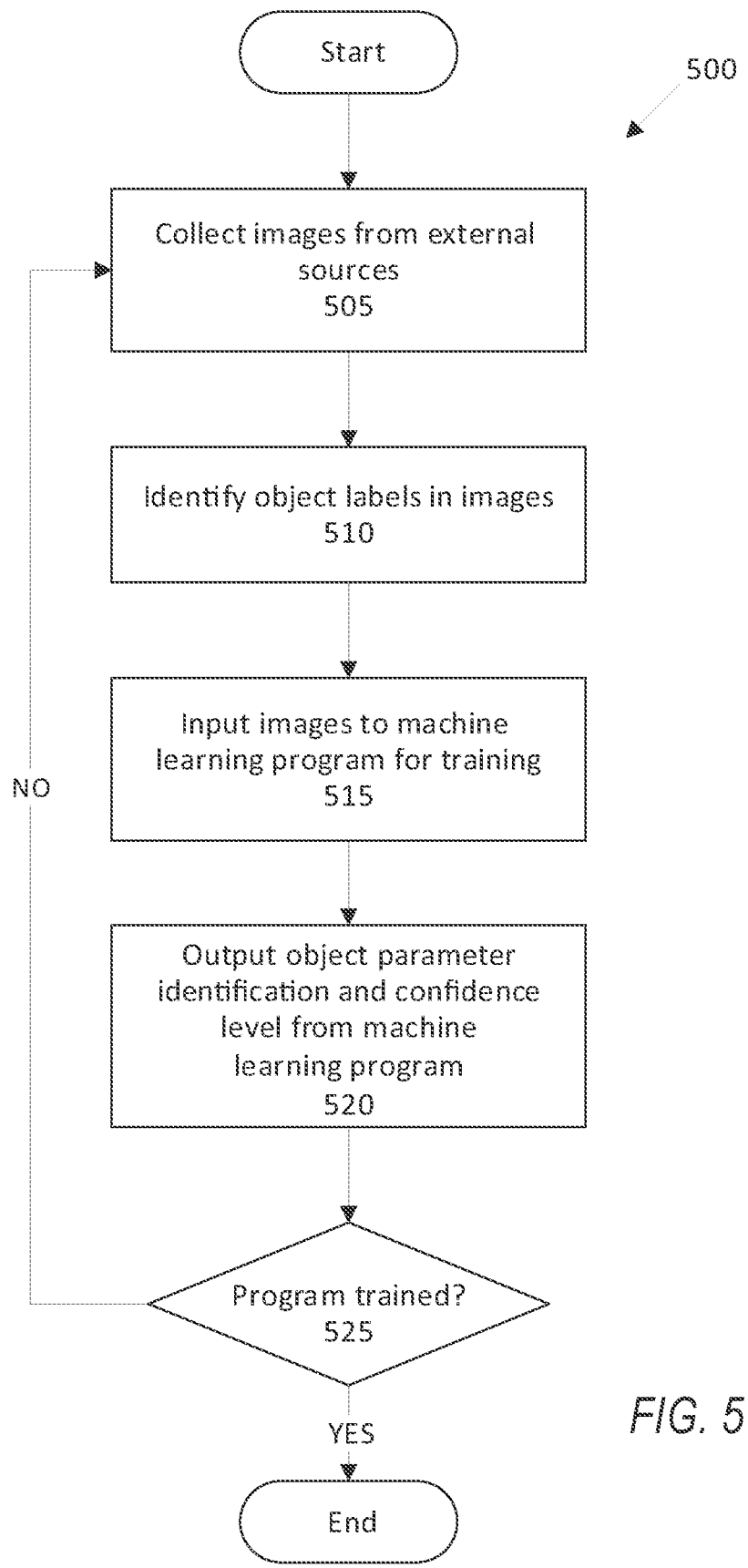
FIG. 5 is a block diagram of an example process for training a machine learning program to identify the object parameter in the image.

FIG. 5 is a block diagram of an example process 500 for training a machine learning program 205 to output a confidence level 210 of an identification 215 of an object in an image, i.e., a confidence program 205. The process 500 starts in a block 505, in which an image collection program 200 in a server 130 collects a plurality of images from one or more external servers 130. As described above, the image collection program 200 can be a web scraping algorithm that collects images that include specified keywords in HTML and/or XML tags. The keywords can be specified by human input, e.g., a manufacturer, a supplier, a retailer, a product manual, etc. The image collection program 200 can collect a plurality of images from one or more websites on the Internet.

Next, in a block 510, the server 130 identifies object labels in the collected images. The image collection program 200 can be trained to include the text in the HTML and/or XML tags as an object label annotated to the image. The text in the HTML and/or XML tags typically identifies an object in the image, and the image collection program 200 can assign the object label from the HTML and/or XML tag to the image to identify one or more objects in the image. The server 130 can determine a training dataset that includes images with the object labels collected by the image collection program 200.

Next, in a block 515, the server 130 inputs the images from the training dataset to the machine learning program 205. The server 130 inputs the images with the object labels to train the machine learning program 205 to output respective confidence levels 210 and identifications 215 of object parameters in the images. As described above, the server 130 uses the images in the training dataset as reference images to train the machine learning program 205.

Next, in a block 520, the machine learning program 205 outputs an identification 215 of an object parameter and a confidence level 210 of identifying the object parameter for each image in the training dataset. The machine learning program 205 can, as described above with respect to the deep neural network 400, apply one or more weights w and biases b to each node 405 through successive layers of the DNN 400. The machine learning program 205 then outputs the identification 215 and the confidence level 210 for each image in the training dataset.

Next, in a block 525, the server 130 determines whether the machine learning program 205 is trained. As described above, the server 130 can determine that the machine learning program 205 is trained when a cost function between the output identification 215 of the object and the confidence level 210 and the input image with the object label is minimized. The machine learning program 205 can be trained to output data values that correlate to the objects, and the output data values can be compared to the annotations to identify a difference, i.e., the cost function of the output data values and the input annotated images. The server 130 can adjust weights w and biases b to reduce the output of the cost function, i.e., to minimize the difference between the output data values and the input annotated images. If the server 130 determines that the machine learning program 205 is trained, the process 500 ends. Otherwise, the process 500 returns to the block 505.

Figure 6:
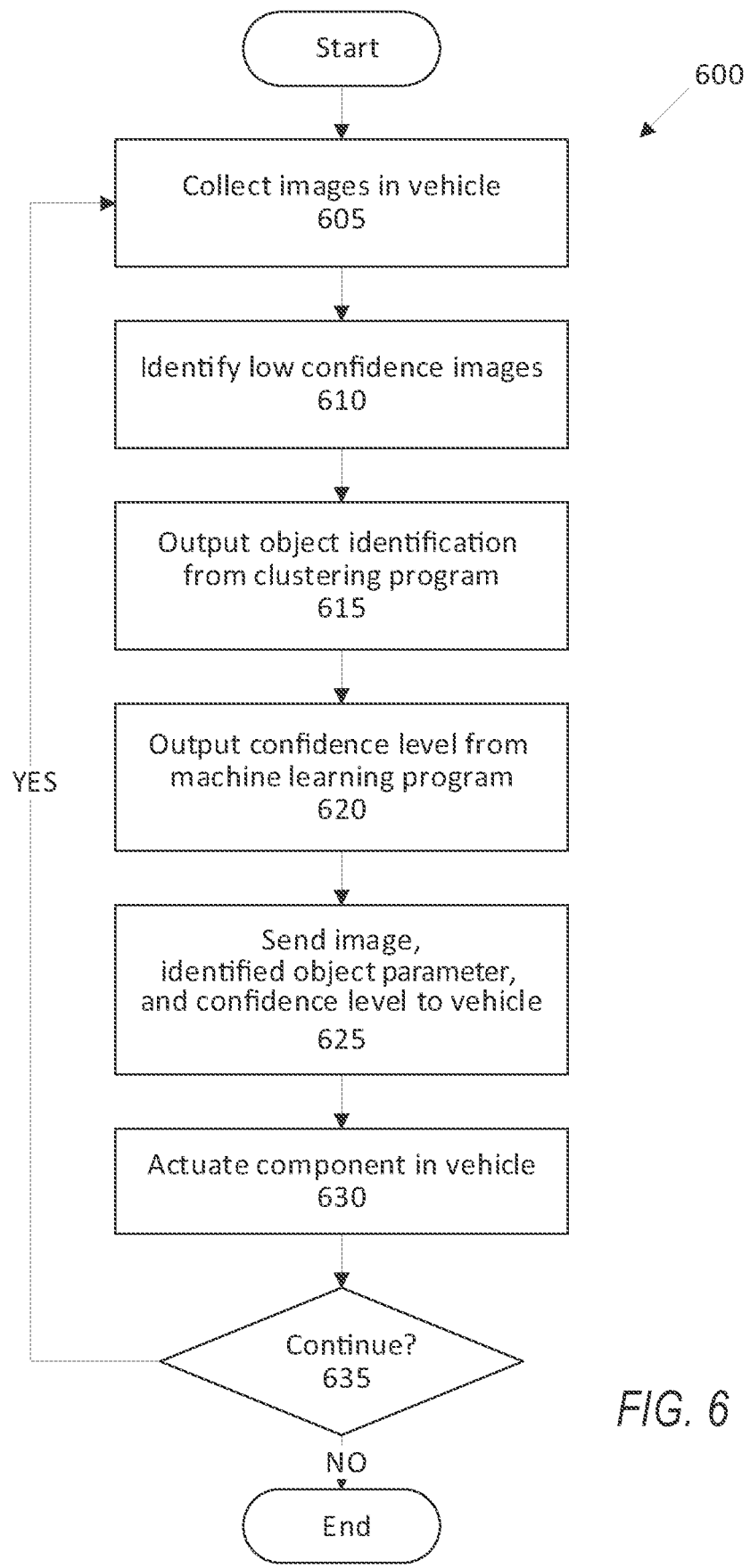
FIG. 6 is a block diagram of an example process for identifying the object parameter in the image with the machine learning program.

FIG. 6 is a block diagram of an example process 600 for identifying an object parameter in an image. The process 600 begins in a block 605, in which a vehicle 105 collects one or more images. A computer 110 in the vehicle 105 can actuate a camera 115 to collect images of a surrounding environment of the vehicle 105. For example, the computer 110 can collect images of a trailer behind the vehicle 105.

Next, in a block 610, the computer 110 identifies one or more low confidence images and transmits the low confidence images to a server 130. As described above, a low confidence image is an image in which the computer 110 determines that a confidence level of an identification of an object in the image is below a threshold. Upon identifying the low confidence images, the computer 110 transmits the low confidence images to the server 130 to identify objects in the low confidence images.

Next, in a block 615, the server 130 inputs the low confidence images to an object clustering program 220 to output an identification of an object and/or an object parameter in each low confidence images. As described above, the clustering program 220 is a machine learning program that is trained to assign each low confidence image to one of a plurality of clusters. Each cluster is associated with a specific object or object parameter, and the clustering program 220 can identify the object and/or object parameter in the low confidence image as the object associated to the cluster to which the low confidence image is assigned.

Next, in a block 620, the server 130 inputs the low confidence images and the output identifications from the object clustering program 220 to a confidence program 205, the confidence program 205 being a machine learning program trained to output a respective confidence level 210 of an identification 215 of each object parameter in the images. As described above, the confidence level is a measure that the identification 215 of the object is correct. The confidence program 205 can be trained with a training dataset, as described above in the process 500, to identify objects in the images and the confidence level 210 of the identifications 215 each object.

Next, in a block 625, the server 130 sends, to the computer 110, the low confidence images with an identification 215 of each object parameter for each image and a confidence level 210 of the identification 215 of each object parameter. The server 130 can send a message over the network 125 including the image and the output from the machine learning programs 205, 220.

Next, in a block 630, the computer 110 actuates one or more components 120 based on the object parameter identifications 215 and the confidence levels 210. For example, the computer 110 can actuate a propulsion to move the vehicle 105 in reverse based on an identified trailer in the low confidence image. The message from the server 130 can include an identified trailer angle $\theta$ of the trailer in the image, and the computer 110 can actuate the propulsion to move the vehicle 105 based on the trailer angle.

Next, in a block 635, the computer 110 determines whether to continue the process 600. For example, the computer 110 can determine not to continue the process 600 when the vehicle 105 has stopped and powered off. If the computer 110 determines to continue, the process 600 returns to the block 605. Otherwise, the process 600 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
   determine a training dataset that includes a plurality of images each including a first object and an object label corresponding to the object;
   train a first machine learning program to identify respective object parameters of the first objects in the plurality of images based on the object labels corresponding to the first objects and a confidence level based on a standard deviation of a distribution of a plurality of identifications of the object parameters;
   receive, from a second machine learning program, a plurality of second images each including a second object identified with a low confidence level, wherein the low confidence level corresponds to a confidence level that the second object identity is correct being less than a first threshold;
   process the plurality of second images with the first machine learning program to identify second object parameters with a corresponding second confidence level;
   output, from the second machine learning program, an identification of no second object in one of the second images, input the second image and the identification of no object to the first machine learning program, and output an identification of the second object parameter in the second image from the first machine learning program; and
   when the first machine learning program identifies the second object parameters with a second confidence level that is greater than a second threshold, retrain the first machine learning program based on the identified second object parameters.

2. The system of claim 1, wherein the second objects in the second images are trailers, and the first machine learning program is trained to output an angle between an axis along the trailer and a vertical axis of the second image as the second object parameter, the second confidence level based on a standard deviation of a distribution of predicted angles from a mean predicted angle.

3. The system of claim 2, wherein the instructions further include instructions to send a message to a vehicle including the second images, respective identification of the trailers in each of the second images, the output angle of each of the second images, and the second confidence level for each of the second images.

4. The system of claim 3, wherein the vehicle includes a computer programmed to actuate a component to move the vehicle in reverse based on the output angles.

5. The system of claim 2, wherein the second confidence level of each of the second images is a multiplicative inverse of the standard deviation of the distribution of the predicted angles from the mean predicted angle.

6. The system of claim 1, wherein the instructions further include instructions to train the second machine learning program to classify the second objects in each of the second images into one of a plurality of classifications based on an identified feature of the object.

7. The system of claim 1, wherein the second machine learning program includes at least one of an autoencoder, a variational encoder, a neural network, or a generative adversarial network.

8. The system of claim 1, wherein the instructions further include instructions to encode a latent image for each of the second images and to output a detection of a second object in the latent image from the second machine learning program.

9. The system of claim 1, wherein the instructions further include instructions to assign each image in the training dataset to a classification based on the object label.

10. The system of claim 1, wherein the instructions further include instructions to receive the second images from a vehicle and assign, with the second machine learning program, each of the plurality of the second images to one of a plurality of classifications.

11. The system of claim 10, wherein the instructions further include instructions to output, from the first machine learning program, a detected second object in one of the plurality of second images not included in one of the plurality of classifications of the second machine learning program.

12. A method, comprising:
determining a training dataset that includes a plurality of images each including a first object and an object label corresponding to the object;
training a first machine learning program to identify respective object parameters of the first objects in the plurality of images based on the object labels corresponding to the first objects and a confidence level based on a standard deviation of a distribution of a plurality of identifications of the first object parameters;
receiving, from a second machine learning program, a plurality of second images each including a second object identified with a low confidence level, wherein the low confidence level corresponds to a confidence level that the second object identity is correct being less than a first threshold;
processing the plurality of second images with the first machine learning program to identify second object parameters with a corresponding second confidence level;
outputting, from the second machine learning program, an identification of no second object in one of the second images, inputting the second image and the identification of no object to the first machine learning program, and outputting an identification of the second object parameter in the second image from the first machine learning program; and
when the first machine learning program identifies the second object parameters with a high second confidence level that is greater than a second threshold, retraining the first machine learning program based on the identified second object parameters.

13. The method of claim 12, wherein the second objects in the second images are trailers, and the first machine learning program is trained to output an angle between an axis along the trailer and a vertical axis of the second image as the second object parameter, the second confidence level based on a standard deviation of a distribution of predicted angles from a mean predicted angle.

14. The method of claim 13, further comprising sending a message to a vehicle including the second images, respective identification of the trailers in each of the second images, the output angle of each of the second images, and the second confidence level for each of the second images.

15. The method of claim 14, wherein the vehicle includes a computer programmed to actuate a component to move the vehicle in reverse based on the output angles.

16. The method of claim 13, further comprising receiving the second images from a vehicle and assigning, with the second machine learning program, each of the plurality of the second images to one of a plurality of classifications.

17. The method of claim 16, further comprising outputting, from the first machine learning program, a detected second object in one of the plurality of second images not included in one of the plurality of classifications of the second machine learning program.

18. The method of claim 12, further comprising training the second machine learning program to classify the second objects in each of the second images into one of a plurality of classifications based on an identified feature of the object.

19. A method, comprising:
determining a training dataset that includes a plurality of images each including a first object and an object label corresponding to the object;
training a first machine learning program to identify respective object parameters of the first objects in the plurality of images based on the object labels corresponding to the first objects and a confidence level based on a standard deviation of a distribution of a plurality of identifications of the first object parameters;
receiving, from a second machine learning program, a plurality of second images each including a second object identified with a low confidence level, wherein the low confidence level corresponds to a confidence level that the second object identity is correct being less than a first threshold;
processing the plurality of second images with the first machine learning program to identify second object parameters with a corresponding second confidence level; and
when the first machine learning program identifies the second object parameters with a high second confidence level that is greater than a second threshold, retraining the first machine learning program based on the identified second object parameters;
wherein the second objects in the second images are trailers, and the first machine learning program is trained to output an angle between an axis along the trailer and a vertical axis of the second image as the second object parameter, the second confidence level based on a standard deviation of a distribution of predicted angles from a mean predicted angle, the method further comprises sending a message to a vehicle including the second images, respective identification of the trailers in each of the second images, the output angle of each of the second images, and the second confidence level for each of the second images.

20. The method of claim 19, wherein the second objects in the second images are trailers, and the first machine learning program is trained to output an angle between an axis along the trailer and a vertical axis of the second image as the second object parameter, the second confidence level based on a standard deviation of a distribution of predicted angles from a mean predicted angle.

21. The system of claim 19, further comprising actuating a component to move the vehicle in reverse based on the output angles.

* * * * *